United States Patent [19]
Lee

[11] Patent Number: 5,905,667
[45] Date of Patent: *May 18, 1999

[54] FULL ADDER USING NMOS TRANSISTOR

[75] Inventor: Boung-Ju Lee, Ahnsan, Rep. of Korea

[73] Assignee: Hyundai Electronics Industries Co., Ltd., Kyoungki-do, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/773,911

[22] Filed: Dec. 27, 1996

[30] Foreign Application Priority Data

Dec. 30, 1995 [KR] Rep. of Korea .................. 95-69519

[51] Int. Cl.$^6$ ........................................ G06F 7/50
[52] U.S. Cl. ................ 364/784.01; 364/784.03; 364/784.05
[58] Field of Search ................ 364/716.07, 784.01, 364/784.02, 784.03, 784.04, 784.05, 786.01, 786.02, 786.03

[56] References Cited

U.S. PATENT DOCUMENTS

| | | | |
|---|---|---|---|
| 4,817,030 | 3/1989 | Lee et al. ................ | 364/784 |
| 5,140,246 | 8/1992 | Rarick ................ | 318/779 |
| 5,406,506 | 4/1995 | Jiasheng et al. ................ | 364/784.05 |
| 5,491,653 | 2/1996 | Taborn et al. ................ | 364/784.05 X |
| 5,719,803 | 2/1998 | Naffziger ................ | 364/784.05 X |

FOREIGN PATENT DOCUMENTS 9310941  11/1993  Rep. of Korea .

*Primary Examiner*—Chuong Dinh Ngo
*Attorney, Agent, or Firm*—Ware, Fressola, Van Der Sluys & Adolphson LLP

[57] ABSTRACT

A full adder includes a static logic block for generating an inverted carry with respect to multiple inputs through an inverted carry output node; a first dynamic inverter logic block for inverting the inverted carry produced from the static logic block via the inverted carry output node according to a clock, to thereby generate a carry through a carry output node; a dynamic logic block for generating an inverted sum with respect to the multiple inputs according to an inverted clock via an inverted sum output node; and a second dynamic inverter logic block for inverting the inverted sum generated from the dynamic logic block via the inverted sum output node according to a clock, to thereby generate a sum through a sum output node.

7 Claims, 5 Drawing Sheets

FULL ADDER USING NMOS TRANSISTOR

BACKGROUND OF THE INVENTION

1. Field of the Invention

The present invention relates to a semiconductor device, and more particularly, to a full adder for implementing a carry logic block and a sum logic block with static and dynamic logics, respectively, using an NMOS transistor.

2. Discussion of Related Art

Generally speaking, a full adder is an adder that receives input signals and outputs two outputs, SUM and CARRY. In case of three-bit full adder, the sum and carry for input signals A, B and C can be expressed as the following logic functions.

SUM=A'B'C'+A'BC'+AB'C'+ABC

CARRY=AB+AC+BC

FIG. 1 shows a conventional full adder using a CMOS transistor. This adder using CMOS transistor runs in negative logic so that the logic functions of SUM and CARRY should be implemented in the negative logic.

SUM'=CARRY'(A+B+C)+ABC

CARRY'={AB+C(A+B)}'

In FIG. 1 the conventional full adder is made up with first to fourth logic blocks 11–14. The first logic block 11 receives three inputs A, B and C and implements inverted carry CARRY'={AB+C(A+B)}'. The second logic block 12 inverts the inverted carry CARRY' outputted from the first logic block 11 to thereby output carry CARRY. The third logic block 13 receives the inverted carry output CARRY' outputted from the first logic block 11, and three inputs A, B and C, to thereby implement inverted sum SUM'=CARRY'(A+B+C)+ABC. The fourth logic block 14 inverts the inverted sum SUM' outputted from the third logic block 13 to thereby output sum SUM.

The logic circuit of the full adder using CMOS transistor is expected to reduce the power consumption, but reduces the processing speed and increases the area of chip because it requires three-stage CMOS logic circuit in order to implement the full adder logic block.

Referring to FIG. 2, a full adder using complementary pass transistor logic (CPL) produces sum SUM and carry CARRY according to the exclusive-ORed signal of two inputs A and B and other input signal C.

If the first and second input signals A and B have different levels, the exclusive-ORed signal A⊕B becomes HIGH so that transmission gates 23 and 25 are turned on and transmission gates 22 and 24 are turned off. As the sum SUM, third input signal C is output after being inverted, and as the carry CARRY, the third. input signal C is output as it as.

If the first and second input signals A and B have the same level, exclusive-ORed signal A⊕B becomes LOW so that transmission gates 23 and 25 are turned off and transmission gates 22 and 24 are turned on. As the sum SUM, third input signal C is outputted as it is, and as the carry CARRY, the second input signal B is outputted as it is. The operation of the full adder using CPL is shown in table 1.

TABLE 1

| A | B | C | B' | A⊕B | 22 | 23 | 24 | 25 | SUM | CARRY |
|---|---|---|---|---|---|---|---|---|---|---|
| 0 | 0 | 0 | 1 | 0(B) | ON | OFF | ON | OFF | 0(C) | 0(B) |
| 0 | 0 | 1 | 1 | 0(B) | ON | OFF | ON | OFF | 1(C) | 0(B) |
| 0 | 1 | 0 | 0 | 1(B) | OFF | ON | OFF | ON | 1(C') | 0(C) |
| 0 | 1 | 1 | 0 | 1(B) | OFF | ON | OFF | ON | 0(C') | 1(C) |

TABLE 1-continued

| A | B | C | B' | A⊕B | 22 | 23 | 24 | 25 | SUM | CARRY |
|---|---|---|---|---|---|---|---|---|---|---|
| 1 | 0 | 0 | 1 | 1(B) | OFF | ON | OFF | ON | 1(C') | 0(C) |
| 1 | 0 | 1 | 1 | 1(B) | OFF | ON | OFF | ON | 0(C') | 1(C) |
| 1 | 1 | 0 | 0 | 0(B) | ON | OFF | ON | OFF | 0(C) | 1(B) |
| 1 | 1 | 1 | 0 | 0(B) | ON | OFF | ON | OFF | 1(C) | 1(B) |

Here, "1" represents the HIGH level signal, and "0" does the LOW level signal.

The full adder using CPL performs the full adding through the transmission gates results in a fast performance speed but there are drawbacks the overall power consumption and the area of chip are increased.

Referring to FIG. 3, like the full adder using CMOS transistor shown in FIG. 1, a full adder using pseudo-NMOS transistor includes first to fourth logic blocks 31–34 for outputting sum SUM and carry CARRY, having the same operation. The difference is that gate-grounded PMOS transistors MP31–MP34 as load are connected between the power terminal VDD and the output stages of the logic blocks. The full adder using pseudo-NMOS transistor can decrease the area of chip but also reduces the processing speed and increases the power consumption.

Referring to FIG. 4, like the full adder using CMOS transistor shown in FIG. 1, a full adder using quasi-domino logic has four logic blocks 41–44 for outputting sum SUM and carry CARRY. The third logic block 43 for outputting sum SUM is made with a dynamic logic circuit, the first logic block for outputting carry CARRY being with a quasi-dynamic logic circuit.

The first logic block 41 of the full adder using quasi-domino logic is designed to output inverted carry CARRY' at the output node NODE1, having a discharging portion with NMOS transistors MN11 and MN12 that perform discharging according to inverted clock CLKB. For instance, if the inverted clock CLKB is HIGH, NMOS transistor MN11 is turned on so that a current path is formed between output node NODE1 and ground VSS. In this state the first logic block 21 performs discharging, and node NODE1 becomes LOW.

Meanwhile, if inverted clock CLKB is LOW, NMOS transistor MN11 is turned off so that the inverted carry CARRY' at node NODE1 is determined according to three input signals A, B and C. Here, inverted carry CARRY' at node NODE1 is shown in table 2.

TABLE 2

| A | B | C | MP13 | MP12 | MP11 | MP14 | MP15 | NODE1 |
|---|---|---|---|---|---|---|---|---|
| 0 | 0 | 0 | ON | ON | ON | ON | ON | 1 |
| 0 | 0 | 1 | OFF | ON | ON | ON | ON | 1 |
| 0 | 1 | 0 | ON | OFF | ON | ON | OFF | 1 |
| 0 | 1 | 1 | OFF | OFF | ON | ON | OFF | 0 |
| 1 | 0 | 0 | ON | ON | OFF | OFF | ON | 1 |
| 1 | 0 | 1 | OFF | ON | OFF | OFF | ON | 0 |
| 1 | 1 | 0 | ON | OFF | OFF | OFF | OFF | 0 |
| 1 | 1 | 1 | OFF | OFF | OFF | OFF | OFF | 0 |

In table 2, if two input signals A and B, A and C, or B and C are LOW at the same time, and only if three inputs A, B and C are LOW at the same time, the inverted carry CARRY' at node NODE1 becomes HIGH. Therefore, it is noted that the first logic block 41 performs CARRY'={AB+C(A+B)}'.

The inverted carry CARRY' of first logic block 41 is applied to the second logic block 42, a dynamic inverter logic logic circuit. The second logic block 42 inverts the inverted carry CARRY' outputted from first logic block 41 according to clock CLK that is HIGH, to thereby output carry CARRY.

The third logic block 43 is a quasi-dynamic logic circuit that performs SUM'={CARRY'(A+B+C)+ABC}'. As the precharging portion for precharging node NODE2, third logic block 43 comprises PMOS transistor MP31. In other words, if clock CLK is LOW, PMOS transistor MP31 is turned on so that node NODE2 is precharged in the HIGH state. If clock CLK is HIGH, PMOS transistor MP31 is turned off so that the inverted sum SUM' at node NODE2 is determined according to inputs A, B and C as shown in table 3.

TABLE 3

| A | B | C | NODE1 | MN35 | MN33 | MN31 | MN32 | MN34 | MN36 | MN37 | NODE2 |
|---|---|---|-------|------|------|------|------|------|------|------|-------|
| 0 | 0 | 0 | 1 | OFF | OFF | OFF | OFF | OFF | OFF | ON  | 1 |
| 0 | 0 | 1 | 1 | ON  | OFF | OFF | OFF | OFF | ON  | ON  | 0 |
| 0 | 1 | 0 | 1 | OFF | ON  | OFF | OFF | ON  | OFF | ON  | 0 |
| 0 | 1 | 1 | 0 | ON  | ON  | OFF | OFF | ON  | ON  | OFF | 1 |
| 1 | 0 | 0 | 1 | OFF | OFF | ON  | ON  | OFF | OFF | ON  | 0 |
| 1 | 0 | 1 | 0 | ON  | OFF | ON  | ON  | OFF | ON  | OFF | 1 |
| 1 | 1 | 0 | 0 | OFF | ON  | ON  | ON  | ON  | OFF | OFF | 1 |
| 1 | 1 | 1 | 0 | ON  | ON  | ON  | ON  | ON  | ON  | OFF | 0 |

In table 3, if inverted carry CARRY' at node NODE1 is HIGH, input A, B or C is HIGH, and three inputs A, B and C are HIGH at the same time, node NODE2 becomes LOW. Therefore, third logic block 43 outputs inverted sum SUM' at node NODE2 according to clock CLK that is HIGH.

Like the second logic block 42, the fourth logic block 44 is a dynamic inverter logic circuit that inverts the inverted sum SUM' output from third logic block 43 according to HIGH clock CLK to thereby output sum SUM.

The quasi-domino full adder logic circuit increases the overall area of chip because the first logic block 41 outputting inverted carry CARRY' is implanted with a PMOS transistor. In addition, the width of voltage swing at nodes NODEl and NODE2 increases to reduces the processing speed in turn because the pull-up transistor is made with PMOS transistor.

SUMMARY OF THE INVENTION

Accordingly, the present invention is directed to a full adder using an NMOS transistor that substantially obviates one or more of the problems due to limitations and disadvantages of the related art.

An object of the present invention is to provide a full adder using an NMOS transistor in which a logic block that generates sum is implanted with a dynamic logic circuit using an NMOS transistor, and a logic block that generates carry is implanted with a static logic circuit using NMOS transistor, to thereby obtain the improvement of processing speed and reduction of chip area and power consumption.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a full adder includes a static logic block for generating an inverted carry with respect to multiple inputs through an inverted carry output node; a first dynamic inverter logic block for inverting the inverted carry generated from the static logic block via the inverted carry output node according to a clock, to thereby generate a carry through a carry output node; a dynamic logic block for generating an inverted sum with respect to the multiple inputs according to an inverted clock via an inverted sum output node; and a second dynamic inverter logic block for inverting the inverted sum generated from the dynamic logic block via the inverted sum output node according to a clock, to thereby generate a sum through a sum output node.

The static logic block comprises: precharging means for precharging the inverted carry output node with a power voltage; and logic means for generating the inverted carry via the inverted carry output node by performing logics for three inputs.

The precharging means of the static logic block comprises a first NMOS transistor to whose drain and gate the power voltage is applied, and whose source is connected to the inverted carry output node.

The logic means of the static logic block comprises: a second NMOS transistor to whose gate a first input is applied, and whose drain is connected to the inverted carry output node; a third NMOS transistor to whose gate a second input is applied, whose drain is connected to the source of the second NMOS transistor, and whose source is grounded; a fourth NMOS transistor to whose gate the second input is applied, and whose drain is connected to the inverted carry output node; a fifth NMOS transistor to whose gate a third input is applied, whose drain is commonly connected to the source of the second NMOS transistor and the drain of the third NMOS transistor, and whose source is grounded; and a sixth NMOS transistor to whose gate the third input is applied, whose drain is connected to the source of the fourth NMOS transistor, and whose source is grounded.

The dynamic logic block comprises: precharging means for precharging the carry output node with a power voltage; and logic means for generating the inverted sum via the inverted sum output node by performing logics for three inputs.

The precharging means of the dynamic logic block comprises a ninth NMOS transistor to whose gate the inverted clock is applied, to whose drain the power voltage is applied, and whose source is connected to the inverted sum output node.

The logic means of the dynamic logic block comprises: a tenth NMOS transistor to whose gate the first input is applied, and whose drain is connected to the inverted sum output node; an eleventh NMOS transistor to whose gate the first input is applied, and whose drain is connected to the inverted sum output node; a twelveth NMOS transistor to whose gate the second input is applied, and whose drain is connected to the inverted sum output node; a thirteenth NMOS transistor to whose gate the second input is applied, and whose drain is connected to the source of the eleventh NMOS transistor; a fourteenth NMOS transistor to whose gate the third input is applied, and whose drain is connected to the inverted sum output node; a fifth NMOS transistor to whose gate the third input is applied, whose drain is connected to the source of the thirteenth NMOS transistor, and whose source is grounded; and a sixteenth NMOS transistor to whose gate the inverted carry output node is connected, whose drain is commonly connected to the sources of the twelveth NMOS transistor, fourteenth NMOS transistor, and fifteenth NMOS transistor, and whose source is grounded.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings.

DETAILED DESCRIPTION OF PREFERRED EMBODIMENT

Reference will now be made in detail to the preferred embodiments of the present invention, examples of which are illustrated in the accompanying drawings.

Figure 1:
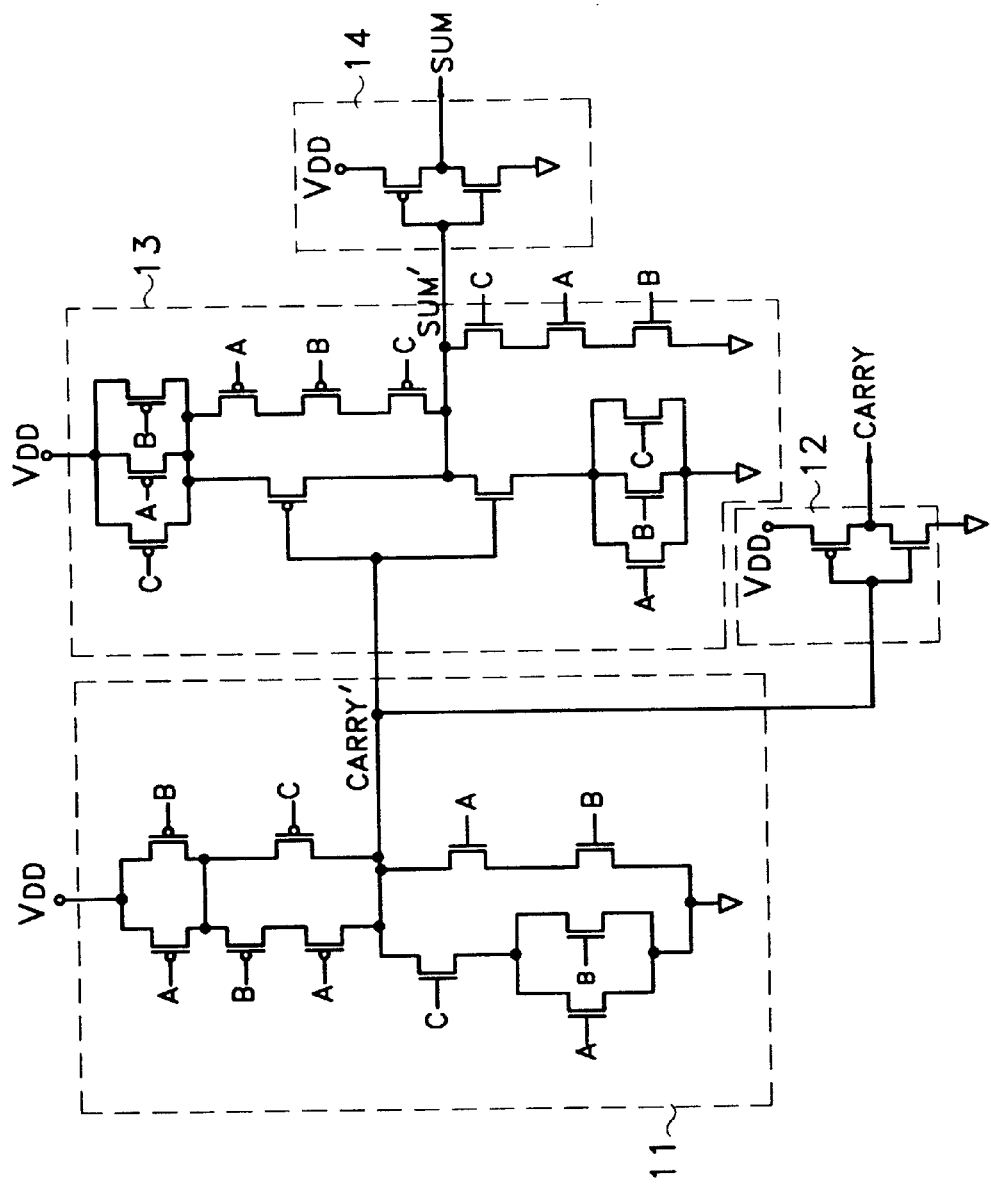
FIG. 1 is a circuit diagram of a conventional full adder using a CMOS transistor.
Figure 2:
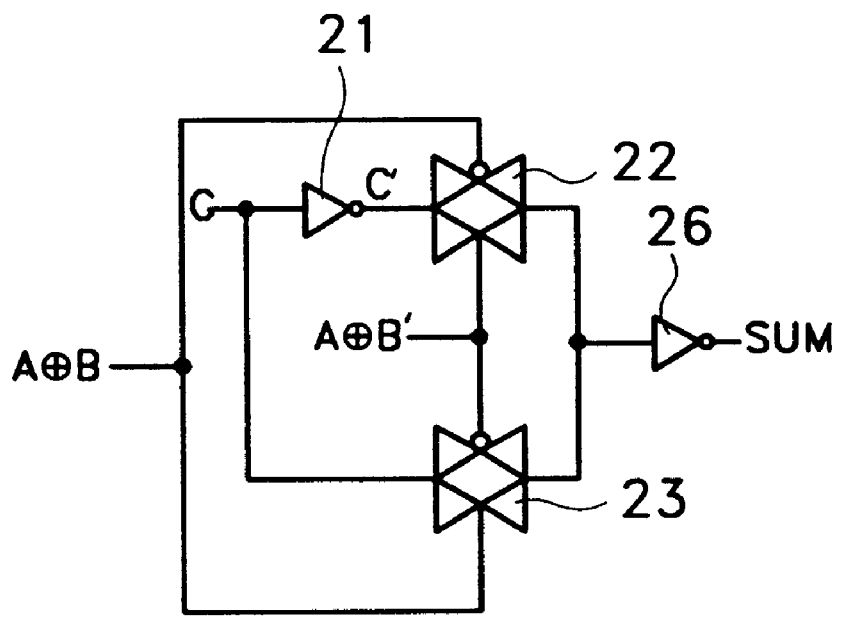
FIG. 2 is a circuit diagram of another conventional full adder using a CPL.
Figure 2:
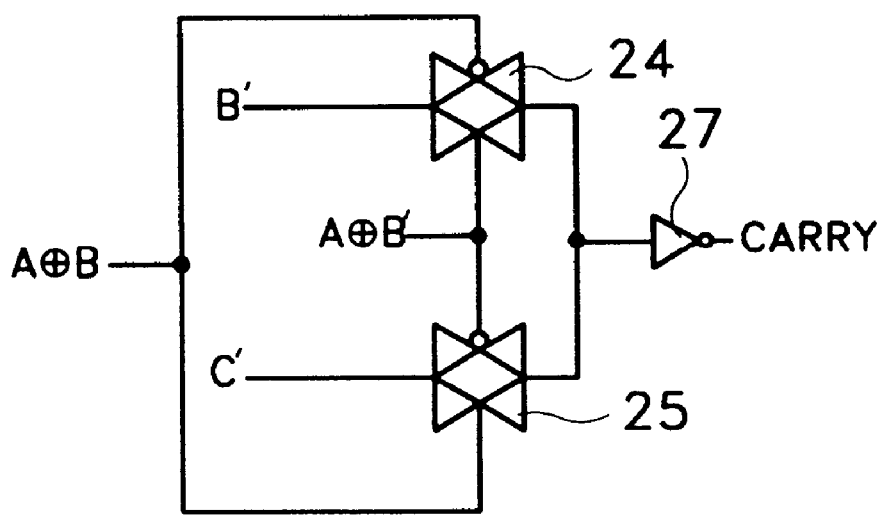
Figure 3:
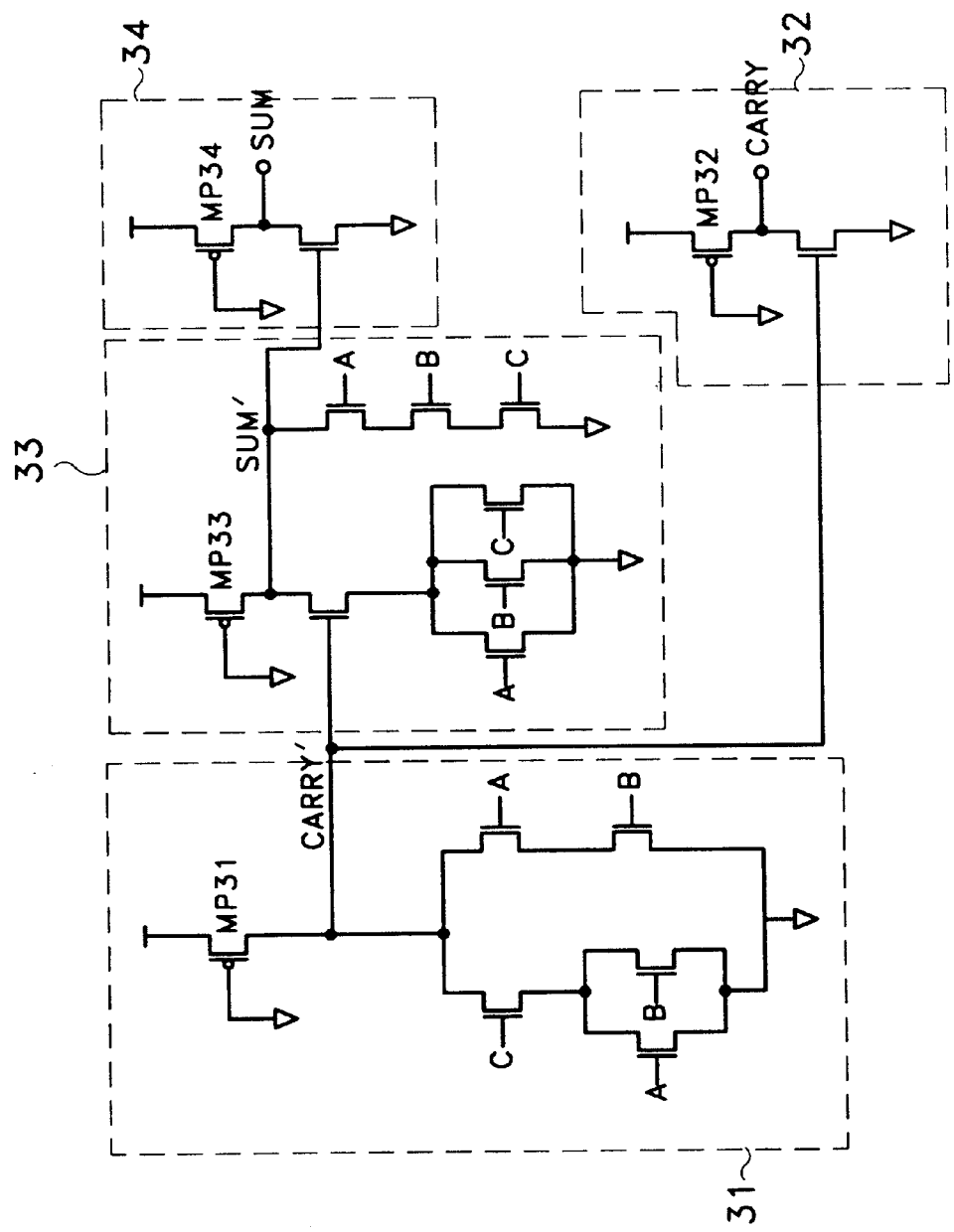
FIG. 3 is a circuit diagram of still another conventional full adder using a pseudo-NMOS transistor.
Figure 4:
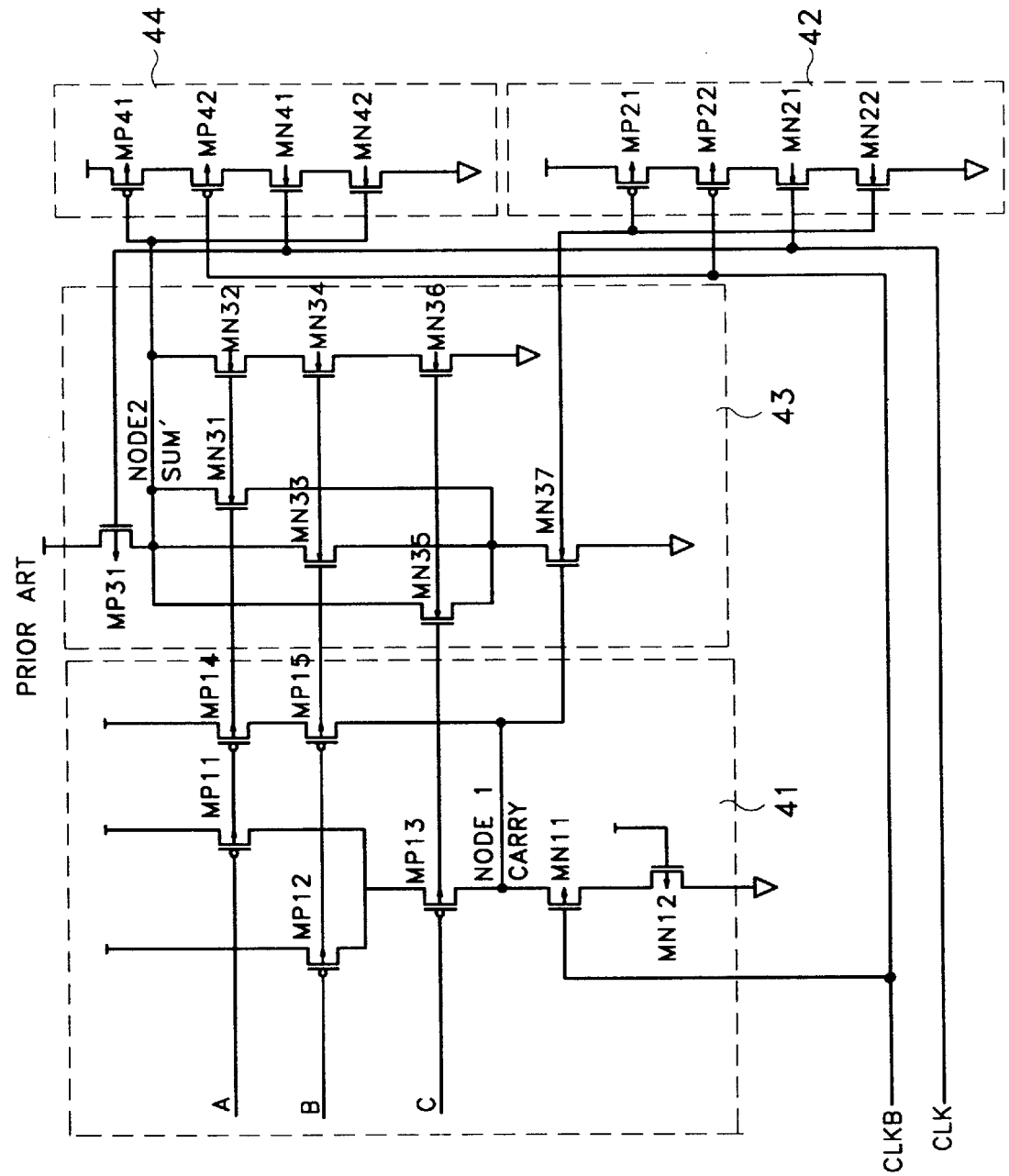
FIG. 4 is a circuit diagram of another conventional full adder using a quasi-domino logic.
Figure 5:
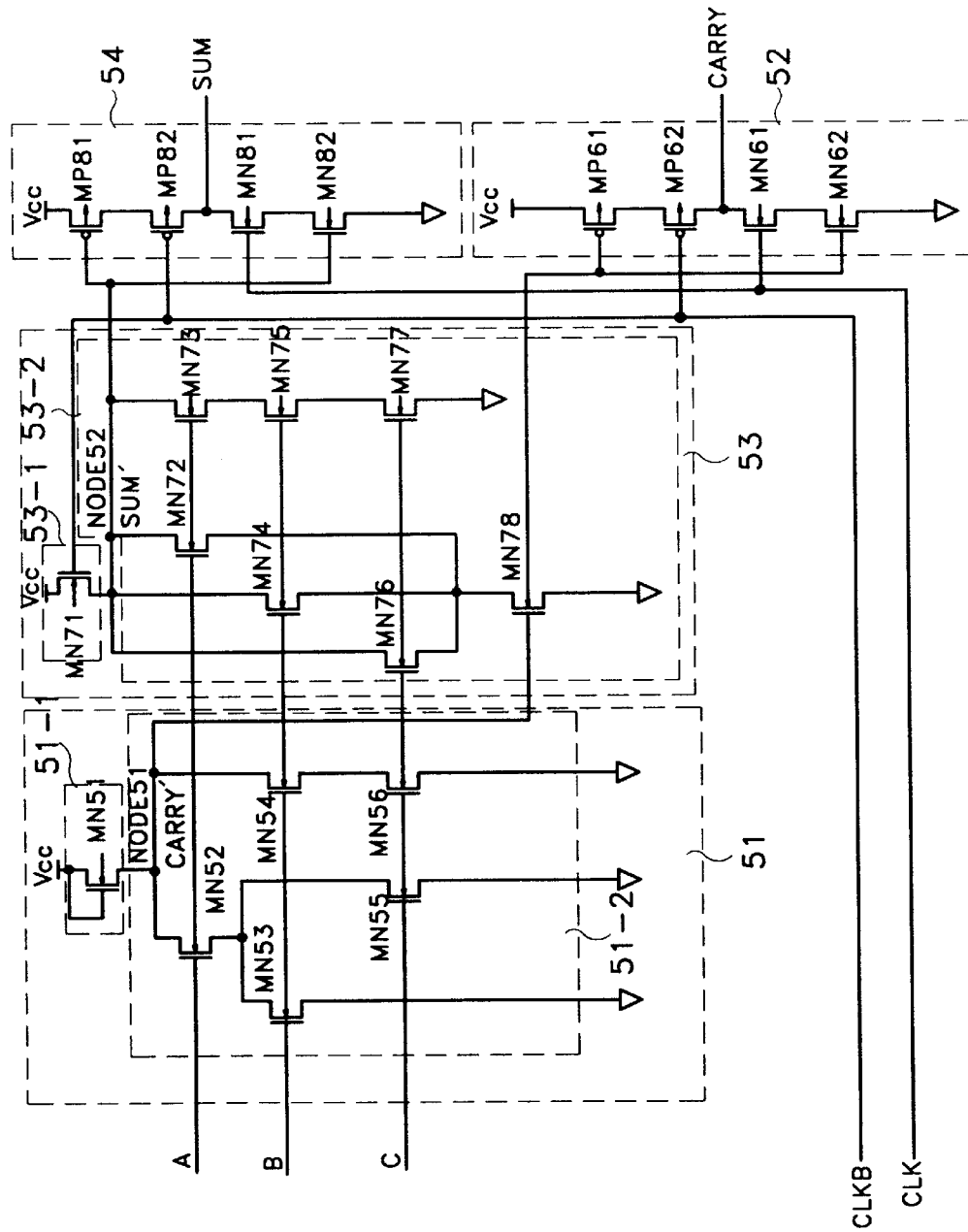
FIG. 5 is a circuit diagram of one embodiment of full adder using an NMOS transistor according to the present invention.

Referring to FIG. 5, one embodiment of full adder of the present invention includes a static logic block 51 for generating an inverted carry CARRY' with respect to inputs A, B and C, a first dynamic inverter logic block 52 for inverting the inverted carry CARRY' generated from the static logic block according to a clock CLK, to thereby generate a carry CARRY, a dynamic logic block 53 for generating an inverted sum SUM' with respect to the inputs A, B, and C according to an inverted clock CLKB, and a second dynamic inverter logic block 54 for inverting the inverted sum SUM' generated from dynamic logic block 53, to thereby generate a sum SUM.

The static logic block 51 includes a precharging portion 51-1 for precharging the inverted carry output node with a power voltage, and a logic portion 51-2 for generating the inverted carry CARRY' by performing logics for inputs A, B and C. Precharging portion 51-1 of static logic block 51 includes a first NMOS transistor MN51 to whose drain and gate the power voltage Vcc is applied, and whose source is connected to the inverted carry output node NODE51.

The logic portion 51-2 of static logic block 51 comprises a second NMOS transistor MN52 to whose gate the first input A is applied, and whose drain is connected to the inverted carry output node NODE51, a third NMOS transistor MN53 to whose gate the second input B is applied, whose drain is connected to the source of the second NMOS transistor MN52, and whose source is grounded, a fourth NMOS transistor MN54 to whose gate the second input B is applied, and whose drain is connected to the inverted carry output node NODE1, a fifth NMOS transistor MN55 to whose gate the third input C is applied, whose drain is commonly connected to the source of second NMOS transistor MN52 and the drain of third NMOS transistor MN53, and whose source is grounded, and a sixth NMOS transistor MN56 to whose gate the third input C is applied, whose drain is connected to the source of fourth NMOS transistor MN54, and whose source is grounded.

The first dynamic inverter logic block 52 comprises a first PMOS transistor MP61 to whose gate the inverted carry CARRY' is applied after being output via the output node NODE51 of static logic block 51, and to whose source the power voltage Vcc its applied, a second PMOS transistor MPG2 to whose gate the inverted clock CLKB is applied, whose source is connected to the drain of first PMOS transistor MP61, and whose drain is connected to the carry output node, a seventh NMOS transistor MN61 to whose gate the clock CLK is applied and whose drain is connected to the carry output node, and an eighth NMOS transistor MN62 to whose gate the inverted carry CARRY' is applied after being output via the output node NODE51 of static logic block 51, whose drain is connected to the source of seventh NMOS transistor MN61, and whose source is grounded.

Dynamic logic block 53 comprises a precharging portion 53-1 for precharging the inverted sum output node with the power voltage, and a logic portion 53-2 for generating the inverted sum SUM' to the inverted sum output node NODE52 by performing the logics for inputs A, B and C.

The precharging portion 53-1 of dynamic logic block 53 includes a ninth NMOS transistor MN71 to whose gate the inverted clock CLKB is applied, to whose drain the power voltage Vcc is applied, and whose source is connected to the inverted sum output node NODE2.

The logic portion 53-2 of dynamic logic block 53 comprises a tenth NMOS transistor MN72 to whose gate the first input A is applied, and whose drain is connected to the inverted sum output node NODE52, an eleventh NMOS transistor MN73 to whose gate the first input A is applied, and whose drain is connected to the inverted sum output node NODE52, a twelveth NMOS transistor MN74 to whose gate the second input B is applied, and whose drain is connected to the inverted sum output node NODE52, a thirteenth NMOS transistor MN75 to whose gate the second input B is applied, and whose drain is connected to the source of eleventh NMOS transistor MN11, a fourteenth NMOS transistor MN76 to whose gate the third input C is applied, and whose drain is connected to the inverted sum output node NODE52, a fifth NMOS transistor MN77 to whose gate the third input C is applied, whose drain is connected to the source of thirteenth NMOS transistor MN75, and whose source is grounded, and a sixteenth NMOS transistor MN78 to whose gate the inverted carry output node is connected, whose drain is commonly connected to the sources of twelveth NMOS transistor MN74, fourteenth NMOS transistor MN76, and fifteenth NMOS transistor MN77, and whose source is grounded.

The second dynamic inverter logic block 54 comprises a third PMOS transistor MP81 to whose gate the inverted sum SUM' is applied after being output via the output node NODE52 of dynamic logic block 53, and to whose source the power voltage Vcc is applied, a fourth PMOS transistor MPS2 to whose gate the inverted clock CLKB is applied, whose source is connected to the drain of third PMOS transistor MP81, and whose drain is connected to the carry output node, a seventeenth NMOS transistor MN81 to whose gate the clock CLK is applied, and whose drain is connected to the sum output node, and an eighteenth NMOS transistor MN82 to whose gate the inverted sum SUM' is applied after being output via the output node NODE52 of dynamic logic block 53, whose drain is connected to the source of seventeenth NMOS transistor MN81, and whose source is grounded.

From now on, the operation of the full adder of the present invention constructed as above will be described.

NMOS transistor MN51, the precharging portion 51-1 of static logic block 51, is always turned on so that inverted carry output node NODE51 is precharged in the HIGH state. If two input signals A and B, B and C or A and C of three input signals A, B and C are HIGH or three inputs A, B and C are all HIGH, a current path is formed between output node NODE51 and the ground so that the LOW inverted carry CARRY' is output via output node NODE51.

The inverted carry CARRY' generated from static logic block 51 is applied to first dynamic inverter block 52, and PMOS transistors MP61 and MP62 are turned on according to LOW inverted clock CLK. Accordingly, the LOW inverted carry CARRY' is inverted so that the HIGH carry CARRY is output.

In dynamic logic block 53, NMOS transistor MN71 is turned on according to HIGH inverted clock CLKB so that the inverted sum output node NODE52 is precharged in the HIGH state. If the three inputs A, B and C are all HIGH or if the inverted carry output CARRY' generated from static logic block 51 is HIGH and only one of the three inputs is HIGH, a current path is formed between the output node NODE52 and the ground so that the inverted sum SAM' becomes LOW at output node NODE52.

The inverted sum SUM' generated from dynamic logic block 53 is applied to PMOS transistor MP81 of second dynamic inverter logic block 54. PMOS transistors MP81 and MP82 are turned on according to LOW inverted clock CLKB so that sum SUM becomes HIGH. The result of generating the sum SUM and carry CARRY through static logic block 52 and dynamic logic block 54 is the same as in table 3.

According to the present invention, the logic block for generating the carry for the input signal is formed with a static logic circuit using NMOS transistor instead of the conventional PMOS transistor, to thereby reduce the power consumed and improve the processing speed. In addition, instead of the discharging circuit formed with two NMOS transistors in the logic block that generates the carry, a precharging circuit of one NMOS transistor is used to thereby reduce the area of chip and the power consumed.

Furthermore, the pull-up transistor, the precharging circuit in the logic block that generates sum, is made with an NMOS transistor to thereby reduce the width of voltage swing and improve the processing speed. It will be apparent to those skilled in the art that various modifications and variations can be made in a full adder using an NMOS transistor of the present invention without departing from the spirit or scope of the invention. Thus, it is intended that the present invention cover the modifications and variations of this invention provided they come within the scope of the appended claims and their equivalents.

What is claimed is:

1. A full adder comprising:
   a static logic block for generating an inverted carry with respect to multiple inputs through an inverted carry output node;
   a first dynamic inverter logic block for inverting the inverted carry generated from the static logic block via the inverted carry output node according to a clock, to thereby generate a carry through a carry output node;
   a dynamic logic block for generating an inverted sum with respect to the multiple inputs according to an inverted clock via an inverted sum output node; and
   a second dynamic inverter logic block for inverting the inverted sum generated from the dynamic logic block via the inverted sum output node according to a clock, to thereby generate a sum through a sum output node.

2. The full adder as claimed in claim 1, wherein the static logic block comprises:
   precharging means for precharging the inverted carry output node with a power voltage; and
   logic means for generating the inverted carry via the inverted carry output node by performing logics for three inputs.

3. The full adder as claimed in claim 2, wherein the precharging means of the static logic block comprises a first NMOS transistor to whose drain and gate the power voltage is applied, and whose source is connected to the inverted carry output node.

4. The full adder as claimed in claim 2, wherein the logic means of the static logic block comprises:
   a second NMOS transistor to whose gate a first input is applied, and whose drain is connected to the inverted carry output node;
   a third NMOS transistor to whose gate a second input is applied, whose drain is connected to the source of the second NMOS transistor, and whose source is grounded;
   a fourth NMOS transistor to whose gate the second input is applied, and whose drain is connected to the inverted carry output node;
   a fifth NMOS transistor to whose gate a third input is applied, whose drain is commonly connected to the source of the second NMOS transistor and the drain of the third NMOS transistor, and whose source is grounded; and
   a sixth NMOS transistor to whose gate the third input is applied, whose drain is connected to the source of the fourth NMOS transistor, and whose source is grounded.

5. The full adder as claimed in claim 1, wherein the dynamic logic block comprises:
   precharging means for precharging the carry output node with a power voltage; and
   logic means for generating the inverted sum via the inverted sum output node by performing logics for three inputs.

6. The full adder as claimed in claim 5, wherein the precharging means of the dynamic logic block comprises a ninth NMOS transistor to whose gate the inverted clock is applied, to whose drain the power voltage is applied, and whose source is connected to the inverted sum output node.

7. The full adder as claimed in claim 5, wherein the logic means of the dynamic logic block comprises:
   a tenth NMOS transistor to whose gate the first input is applied, and whose drain is connected to the inverted sum output node;

an eleventh NMOS transistor to whose gate the first input is applied, and whose drain is connected to the inverted sum output node;

a twelveth NMOS transistor to whose gate the second input is applied, and whose drain is connected to the inverted sum output node;

a thirteenth NMOS transistor to whose gate the second input is applied, and whose drain is connected to the source of the eleventh NMOS transistor;

a fourteenth NMOS transistor to whose gate the third input is applied, and whose drain is connected to the inverted sum output node;

a fifteenth NMOS transistor to whose gate the third input is applied, whose drain is connected to the source of the thirteenth NMOS transistor, and whose source is grounded; and a sixteenth NMOS transistor to whose gate the inverted carry output node is connected, whose drain is commonly connected to the sources of the twelveth NMOS transistor, fourteenth NMOS transistor, and fifteenth NMOS transistor, and whose source is grounded.

* * * * *

UNITED STATES PATENT AND TRADEMARK OFFICE
CERTIFICATE OF CORRECTION

PATENT NO. : 5,905,667
DATED : May 18, 1999
INVENTOR(S) : B. Lee

It is certified that error appears in the above-identified patent and that said Letters Patent is hereby corrected as shown below:

```
col. 1, line 25, please cancel "." after "first"; and
   at line 51, please cancel "." after "third".
 col. 3, line 41, please cancel "reduces" and substitute
--reduce-- therefor.
 col. 6, line 20, please cancel "its" and substitute --is--;
and at line 21, cancel "MPG2" and substitute --MP62-- therefor.
 col. 7, line 4, please cancel "MPS2" and substitute --MP82--
and  at line 38, please cancel "SAM'" and substitute --SUM'--.
```

Signed and Sealed this

Twenty-sixth Day of October, 1999

Attest:

Q. TODD DICKINSON

*Attesting Officer*   *Acting Commissioner of Patents and Trademarks*